US011304148B2

(12) United States Patent
Sood et al.

(10) Patent No.: US 11,304,148 B2
(45) Date of Patent: Apr. 12, 2022

(54) METHODS FOR SETTING TRANSMIT POWER IN WIRELESS DEVICES

(71) Applicant: Cypress Semiconductor Corporation, San Jose, CA (US)

(72) Inventors: Ayush Sood, Bangalore (IN); Kamesh Medapalli, San Jose, CA (US); Rajendra Kumar Gundu Rao, Bangalore (IN); Patrick Cruise, San Jose, CA (US); Roshni Sulekhakumari, Bangalore (IN); Manoj George, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/586,243

(22) Filed: Sep. 27, 2019

(65) Prior Publication Data

US 2021/0099961 A1   Apr. 1, 2021

(51) Int. Cl.
*H04W 52/50* (2009.01)
*H04W 52/22* (2009.01)
*H04W 52/24* (2009.01)
*H04W 52/36* (2009.01)
*H04W 84/12* (2009.01)

(52) U.S. Cl.
CPC ......... *H04W 52/225* (2013.01); *H04W 52/24* (2013.01); *H04W 52/367* (2013.01); *H04W 52/50* (2013.01); *H04W 84/12* (2013.01)

(58) Field of Classification Search
CPC . H04W 52/225; H04W 52/367; H04W 52/50; H04W 52/24; H04W 84/12
See application file for complete search history.

(56) References Cited

U.S. PATENT DOCUMENTS

| 8,565,343 B1* | 10/2013 | Husted | H04B 1/0475 |
| | | | 375/297 |
| 9,720,033 B2 | 8/2017 | Savoj et al. | |
| 9,866,259 B1* | 1/2018 | Margomenos | H04B 1/40 |
| 2008/0287076 A1* | 11/2008 | Shen | H04B 1/0475 |
| | | | 455/114.3 |

(Continued)

OTHER PUBLICATIONS

International Search Report for International application No. PCT/US2020/049943 dated Dec. 9, 2020, 2 pages.

(Continued)

*Primary Examiner* — Wen W Huang

(57) ABSTRACT

Disclosed are methods and systems for tailoring the transmit power of a wireless device to the parameters of the device such as the process split, voltage, and temperature. The device may identify one or more parameters of the device such as identifying the process split, or sensing the operating voltage or temperature. The device may determine an updated transmit power based on the known parameter values identified and any unknown parameter values. The updated transmit power is determined to be a maximum transmit power that meets one or more target transmit metrics, such as EVM and spectral mask, when the device transmits based on the known parameter values and across a range of variations of the unknown parameter values. The device may adjust its transmit power based on the updated transmit power periodically.

30 Claims, 7 Drawing Sheets

(56) References Cited

U.S. PATENT DOCUMENTS

| | | | |
|---|---|---|---|
| 2009/0042525 A1* | 2/2009 | Rajagopal | H04W 52/367 455/232.1 |
| 2010/0060356 A1* | 3/2010 | Suzuki | H03F 1/3258 330/149 |
| 2013/0052964 A1* | 2/2013 | Husted | H04B 17/11 455/73 |
| 2017/0089975 A1* | 3/2017 | Savoj | G06F 1/3203 |
| 2017/0272299 A1* | 9/2017 | Chae | H04J 11/00 |

OTHER PUBLICATIONS

Written Opinion of the International Searching Authority for International application No. PCT/US2020/049943 dated Dec. 9, 2020, 8 pages.

* cited by examiner

METHODS FOR SETTING TRANSMIT POWER IN WIRELESS DEVICES

TECHNICAL FIELD

The subject technology generally relates to wireless communication systems, and more particularly, to methods and systems for setting transmit power for devices that operate in wireless communication channels to increase the transmission range as a function of the characteristics of the devices and the operating environment of the devices.

BACKGROUND

WLAN systems complying with the IEEE 802.11 (WiFi™) standard are used by a wide array of devices, including increasingly by low-power Internet of things (IoT) devices to communicate sensor data and other types of information. The range of transmission of the wireless devices and the link budget are determined by, among other factors, the transmit power of the wireless devices. The transmit power of the wireless devices may be limited by regulatory constraints and device characteristics such as the relationship between demodulation errors and transmit power of the devices. For example, the transmit power has to meet the adjacent channel power rejection (ACPR) requirement of the WiFi™ standard, which imposes constraints on the spectral mask of the transmission from the devices. The transmit power is further limited by the error vector magnitude (EVM) for different modulation and encoding schemes due to non-linearities in the radio frequency (RF) transmitters, etc. One way to increase the transmit power of the wireless devices while remaining compliant with the regulatory power requirements may be to improve device characteristics such as by reducing the EVM or the spectral mask margin. However, such changes to the wireless devices may incur penalties in increased complexity, cost, area, and power of the wireless devices. It is desirable to increase the transmit power and the resulting transmission range without these drawbacks for wireless devices communicating using WLAN, Bluetooth, etc., and in wide area networks.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
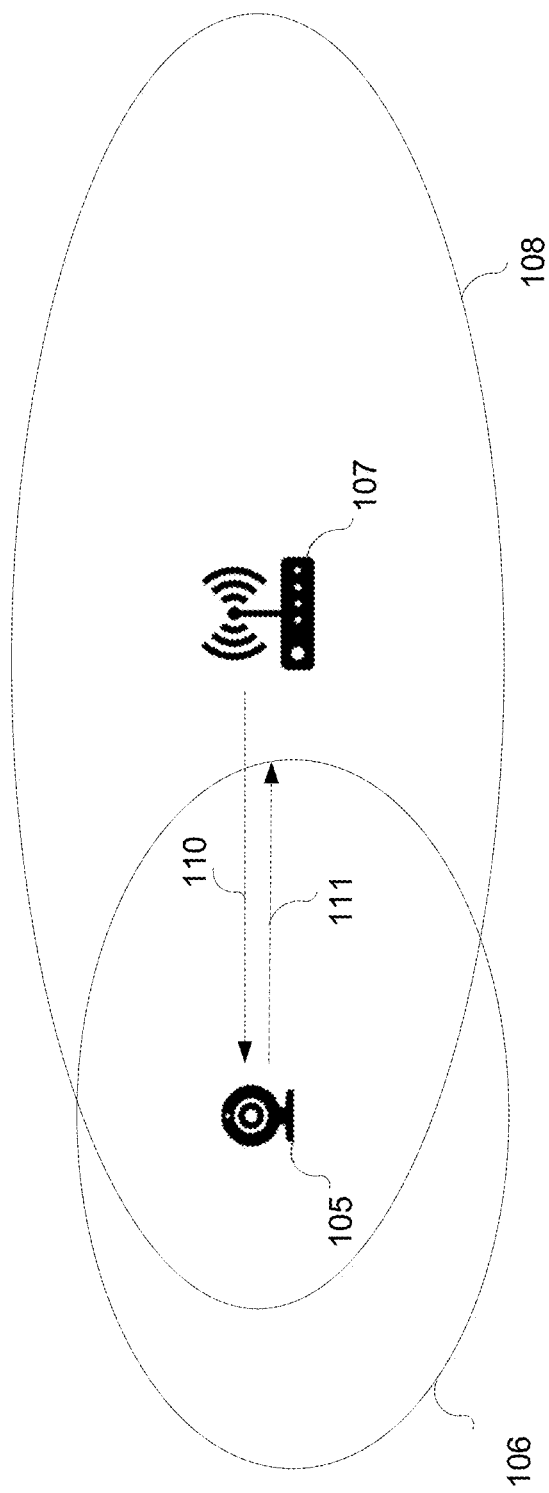
FIG. 1 illustrates an example of a WLAN system in which a wireless device communicates with an access point (AP), in accordance with one embodiment of the present disclosure.

Examples of various aspects and variations of the subject technology are described herein and illustrated in the accompanying drawings. The following description is not intended to limit the invention to these embodiments, but rather to enable a person skilled in the art to make and use this invention. For example, while examples, implementations, and embodiments of the subject technology are described using wireless devices operating in a WLAN system that complies with various versions of the IEEE 802.11 (WiFi™) standard, the subject technology is not thus limited and may be applicable to other types of communication devices operating in other types of WLAN systems or in a wide area network.

The transmit power of a wireless device operating under the WiFi™ standard has to comply with transmission requirements imposed by the standard and by regulatory authorities of the jurisdictions in which the wireless device operates, and may meet transmit metrics associated with the operation of the device. For example, the WiFi™ standard has requirements on ACPR to limit interference to channels adjacent to the operating channel. The ACPR acts as a target spectral mask to constrain the power spectrum of the wireless device over the bandwidth of the operating channel. The wireless device may have its own transmit metrics such as EVM and transmit power dynamic range. The EVM measures the deviation in the constellation points of a signal modulation scheme from their ideal locations due to imperfections in the implementation of the transmitter of the wireless device. To meet a given bit error rate for a modulation and coding schemes used to transmit at a given data rate, the EVM of the wireless device may not exceed a maximum EVM. Higher modulation and coding schemes used to transmit increasingly higher data rates may have increasingly lower and thus more stringent maximum EVM requirements. The transmit power of a wireless device may be further limited to operate over a transmit power control (TPC) dynamic range to meet various error requirements.

The spectrum mask and the EVM of a wireless device may be a function of the transmit power, device parameters, and functional and operating characteristics of the device. For example, a higher transmit power will generally result in a larger EVM and lower spectral mask margin. In addition, device parameters such as the fabrication process split of the RF transmitter, which are process variations that statistically occur in the wafer manufacturing of the RF transmitter, functional characteristics such as the transmission mode and modulation, coding schemes, etc., and operating characteristics such as the supply voltage, ambient temperature, junction temperature, etc. may affect the EVM and spectral mask. For a given combination of transmission mode, and modulation and coding scheme (MCS), the maximum transmit power that meets the maximum EVM, referred to as EVM compliant power, and target spectral mask, referred to as SM compliant power, may vary across devices fabricated over a range of process splits and operating over a range of supply voltages and temperatures. A wireless device may operate with the transmit power that is the minimum of the EVM compliant power and SM compliant power across the range of process splits, possible operating voltages, and possible temperatures to ensure that the transmit power is always EVM and SM compliant regardless of the actual process split, voltage, and temperature. However, most wireless devices operate over a relatively narrow range centered over a nominal voltage and a nominal temperature. The wireless device may leverage known information on the process split, voltage, and temperature, or a subset of these to increase the transmit power and to improve range while complying with regulatory requirements and meeting transmit metrics.

In one aspect of the subject technology, the wireless device may tailor the transmit power to the actual operating voltage or temperature, or both the voltage and temperature, by operating with the transmit power that has been characterized to be EVM and SM compliant for one or both of the actual operating voltage and temperature. For example, to tailor the transmit power to only the actual operating voltage, the wireless device may operate with the EVM and SM compliant power that has been characterized as the minimum of the EVM compliant power and SM compliant power over the actual operating voltage, the range of possible temperatures, and the range of process splits. Similarly, to tailor the transmit power to only the actual temperature, the wireless device may operate with the EVM and SM compliant power characterized as the minimum of the EVM compliant power and SM power over the actual temperature, the range of possible voltages, and the range of process splits. And to tailor the transmit power to both actual voltage and actual temperature, the wireless device may operate with the EVM and SM compliant power characterized as the minimum of the EVM compliant power and SM compliant power over the actual operating voltage, the actual temperature, and the range of process splits. In one embodiment, there may be a margin or tolerance associated with one or more of the EVM and SM compliant power. The tolerance of the EVM or SM compliant power may also be a function of the device parameters, and functional and operating characteristics of the device. In one embodiment, the tolerance of the EVM, SM compliant power, or other Tx metrics may be programmable as a function of the device parameters, and functional and operating characteristics of the device. When tailoring the transmit power, the wireless device may take into account the tolerances of the EVM and SM compliant power for the actual operating voltage and the actual temperature. Because the transmit power that has been characterized to be EVM and SM compliant over one or both of the actual operating voltage and temperature cannot be lower than the EVM and SM compliant power across the range of process splits, all possible operating voltages, and all possible temperatures—and is most likely to be higher for devices operating near the nominal voltage and temperature—the wireless device may transmit at the higher power, thus increasing the transmission range and link budget.

In one aspect of the subject technology, the wireless device may additionally identify the process split to tailor the transmit power to the identified process split, the actual operating voltage, and the actual temperature. The wireless device may operate with the EVM and SM compliant power that has been characterized as the minimum of the EVM compliant power and SM compliant power for the actual operating voltage, the actual temperature, and the identified process split.

In one aspect of the subject technology, the wireless device may store a multi-dimensional array of transmit power information to use as the EVM and SM compliant power for a range of quantized process splits, quantized voltage steps, and quantized temperature steps for each combination of transmit mode and MCS. An offline device characterization operation may measure the EVM and SM compliant power for each point in the multi-dimensional array. In one embodiment, the device characterization operation may construct a 5-dimensional array that includes process split, voltage, temperature, transmit mode, and data rate as the dimensions. Each point in the 5-dimensional array may represent the difference between the EVM and SM compliant power for the combination of transmit mode and data rate represented by the point and the EVM and SM compliant power of a reference operating point such as the nominal process split, nominal voltage, and nominal temperature for the combination of transmit mode and data rate. Each point in the 5-dimensional array, or in the 3-dimensional subarray for a specific combination of transmit mode and data rate, may be referred to as the delta transmit power for the point relative to the reference operating point. In other embodiments, the array may have additional dimensions such as the operating channel, operating bandwidth, TPC dynamic range, or other functional and operating characteristics of the wireless device.

The wireless device may be powered up to transmit using the transmit power associated with a reference operating point, such as the nominal process split, nominal voltage, and nominal temperature previously identified. When information about the process split, actual voltage, or the actual temperature is known, the wireless device may use the information to eliminate a dimension from a search space when searching the multi-dimensional array for the minimum of the delta transmit power when determining the transmit power. For example, when the actual voltage is known for a wireless device, the wireless device may avoid searching over all possible voltages by setting the voltage to the actual voltage and may search in two dimensions over the range of process splits and all possible temperatures of the multi-dimensional array to find the minimum delta transmit power for a combination of transit mode and data rate. The wireless device may then adjust its transmit power from the reference operating point by the minimum delta transmit power found, assuring that the transmit power will be EVM and SM compliant regardless of the actual process split and temperature.

Similarly, when both the actual voltage and temperature are known for the wireless device, the wireless device may avoid searching over all possible voltages and all possible temperatures by setting the voltage to the actual voltage and temperature and may search only the process split dimension of the multi-dimensional array to find the minimum delta transmit power for a combination of transmit mode and data rate. The wireless device may then adjust its transmit power from the reference operating point by the minimum delta transmit power found, assuring that the transmit power will be EVM and SM compliant regardless of the actual process split.

When the process split, voltage, and temperature are all known, the wireless device may identify the delta transmit power for the known process split, voltage, and temperature from the multi-dimensional array. The wireless device may then adjust its transmit power from the reference operating point by the delta transmit power. The wireless device may identify the process split of the device by using a ring oscillator to measure the oscillator frequency. Firmware of the wireless device may use the measured ring oscillator frequency to look up a table containing a relationship between the frequency and the process split. In one embodiment, the process split of a wireless device may be identified at manufacturing and programmed into an on-chip non-volatile memory for read out by the firmware of the wireless device during operation. The wireless device may sense the operating or supply voltage by using an on-chip or external sensor. To sense the temperature, the wireless device may use an on-chip temperature sensor, thermistor, etc., that is placed near a hotspot of the device. Because the voltage and temperature may change over time, the wireless device may periodically sense the voltage and temperature to update the delta transmit power from the multi-dimensional array for adjusting the transmit power.

In one embodiment, a method for setting the transmit power of a wireless device includes initializing the transmit power of the device to an initial transmit power. The transmit power is associated with one or more transmit metrics. The method also includes identifying values of one or more parameters of the device to generate one or more known parameter values. The method may determine an updated transmit power based on the known parameter values and any parameters whose values are not known. The updated transmit power may be determined to be the maximum transmit power that meets target transmit metrics when the wireless device transmits based on the known parameter values and across a range of variations of the unknown parameter values. The device may adjust its transmit power based on the updated transmit power. In one embodiment, the device may be a WLAN device that conforms to any version of the IEEE 802.11 (WiFi™) standard.

In another embodiment, a wireless device is configured to implement the method for setting the transmit power of a wireless device to take into account known and unknown values of parameters such as the operating and functional characteristics of the wireless device. The method may be implemented by a controller. The wireless device may include one or more antennas configured to transmit packets using the transmit power over a communication channel.

FIG. 1 illustrates an example of a WLAN system in which a wireless device communicates with an access point (AP), in accordance with one embodiment of the present disclosure. The WLAN system may be any version of the IEEE 802.11 (WiFi™) standard. Wireless device 105 is user equipment, also referred to as a user station (STA), that is configured to associate with an AP 107. In one embodiment, the STA 105 may be a sensor configured to make measurements or gather information of an environment, such as an IP security camera that captures videos of a surrounding area, or a portable communication device such as a smartphone that operates over a local or a wide area network. The STA 105 and the AP 107 may form a basic service set (BSS).

Once associated with the AP 107, the STA 105 may receive commands from the AP 107 and may transmit data to the AP 107.

The transmit power of a wireless device, whether it's the STA 105 or the AP 107, determines the transmission range. Because the STA 105 may be a low power portable device, the STA 105 may have lower transmit power capability compared to the AP 107. For example, the STA 105 may be capable of transmitting with a maximum transmit power of 16 dBm per antenna in the lowest data rate, while the AP may be capable of transmitting up to 21 dBm per antenna. The coverage area 108 of the AP 107 is thus larger than the coverage area 106 of the STA 105. If the STA 105 is at the edge of the coverage area 108 of the AP 107, the STA 105 may receive the downlink (DL) transmission 110 from the AP 107 but the AP 107 may not be able to receive the uplink (UL) transmission 111 from the STA 105, creating an asymmetric link. The transmit power from the STA 105 is also limited by the spectral mask of the WiFi™ standard and the maximum EVM of the transmission mode and MCS used for the transmission. EVM and SM compliant power is a function of the process split, operating voltage, and operating temperature of a wireless device. Embodiments of the disclosure leverage information about one or more of the process split, operating voltage, and operating temperature of the STA 105 to increase the EVM and SM compliant power of the STA 105, increasing the coverage area 106 of the STA 105 and reducing the asymmetry in the bi-directional link. Information about other functional or operating characteristics of the wireless device may be similarly leveraged to increase the EVM and SM compliant power.

Figure 2:
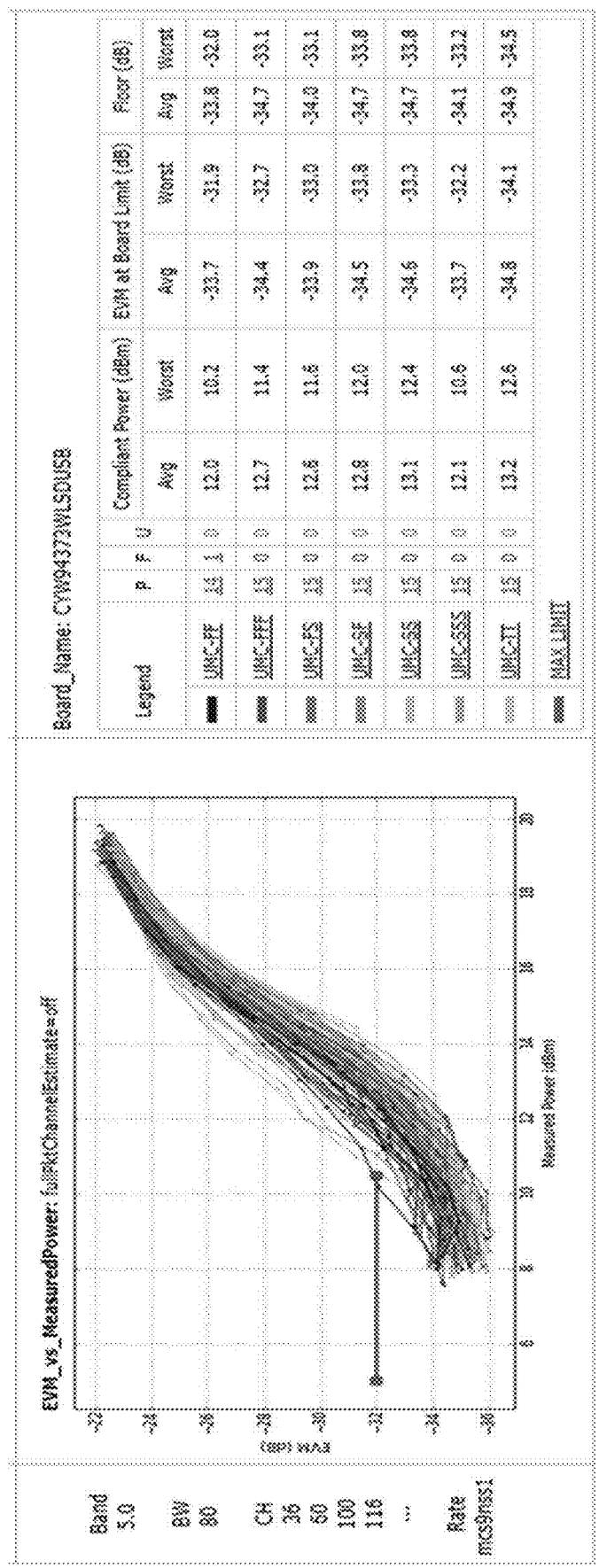
FIG. 2 shows the relationship between the EVM and the transmit power for different process splits, which are process variations that statistically occur in the wafer manufacturing of integrated circuits, for one modulation scheme where the relationship may be used to increase the transmit power as a function of the identified process split of a wireless device in accordance with one embodiment of the present disclosure.

FIG. 2 shows the relationship between the EVM and the transmit power for wireless devices of different process splits operating in one MCS or data rate at a nominal voltage and nominal temperature. Each curve plots the EVM vs. measured transmit power function for one process split. Examples of the process split include fast/fast, fast/slow, slow/fast, slow/slow, typical/typical, etc., where the first designation of the pair denotes the speed of the NMOS device and the second designation of the pair denotes the speed of the PMOS device. For any process split, the EVM increases as the transmit power increases. To meet a given bit error rate for the MCS, a maximum EVM of −32 dB is specified. A wireless device may not transmit with power that results in the EVM exceeding the maximum EVM when operating in the MCS. The maximum transmit power that results in the maximum EVM is the EVM compliant power. For example, devices with the fast/fast process split have an average EVM compliant power of 12 dBm and a worst EVM compliant power of 10.2 dBm. Devices with the typical/typical process split have an average EVM compliant power of 13.2 dBm and a worst EVM compliant power of 12.6 dBm. The lower average EVM compliant power of the fast/fast process split is due to its higher EVM compared to the typical/typical split process for the same transmit power setting, resulting in the device with the fast/fast process split reaching the maximum EVM at a lower transmit power.

FIG. 2 shows that the fast/fast process split has the lowest average EVM compliant power and also the lowest worst EVM compliant power among all the process splits. A wireless device of unknown process split may be forced to transmit at the lowest worst EVM compliant power, i.e., 10.2 dBm when operating at the nominal voltage and nominal temperature for the given MCS, to ensure that its transmit power is EVM compliant even when the device actually is a fast/fast process split. However, if the wireless device is known to be a typical/typical process split, the device may transmit at the higher worst EVM compliant power of the typical/typical process split, i.e., 12.6 dBm. Having information about the process split of the device may thus allow the device to transmit at a higher EVM compliant power than otherwise.

Similarly, a wireless device operating at different voltages and temperatures assuming a nominal process split may exhibit different EVM vs. measured transmit power function, resulting in different EVM compliant power. A wireless device having no knowledge of its voltage and temperature may be forced to transmit at the lowest EVM compliant power across the range of voltages and temperatures to ensure that its transmit power is EVM compliant across the range. However, if information about either or both of the voltage or temperature of the wireless device is known, the device may be able to transmit at a higher EVM compliant power because the range of voltages and temperatures over which the lowest EVM compliant power is determined becomes narrower. For example, if the voltage is known, the lowest EVM compliant power is determined from minimum of the EVM compliant power across the range of temperatures corresponding to the known voltage instead of across the range of both temperatures and voltages. Conversely, if the temperature is known, the lowest EVM compliant power is determined from the minimum of the EVM compliant power across the range of voltages corresponding to the known temperature.

Spectral mask (SM) margin also degrades as transmit power increases. A wireless device operating at different voltages and temperatures and with different process splits may also exhibit different SM vs. transmit power function, resulting in different SM compliant power. A wireless device may similarly leverage information about one or more parameters of process split, voltage, or temperature of the wireless device to determine the lowest SM compliant power over a narrower range of variation of the unknown parameters corresponding to the known parameter or parameters. The transmit power for the wireless device needs to be both EVM and SM compliant, and may be determined from the lower of the EVM compliant power and the SM compliant power for a given MCS. In one embodiment, the EVM compliant power may determine the transmit power for higher MCS used for higher data rate because the EVM compliant power is usually lower than the SM compliant power at the higher MCS. On the other hand, the SM compliant power may determine the transmit power for lower MCS used for lower data rate because the SM compliant power is usually lower than the EVM compliant power at the lower MCS.

Figure 3:
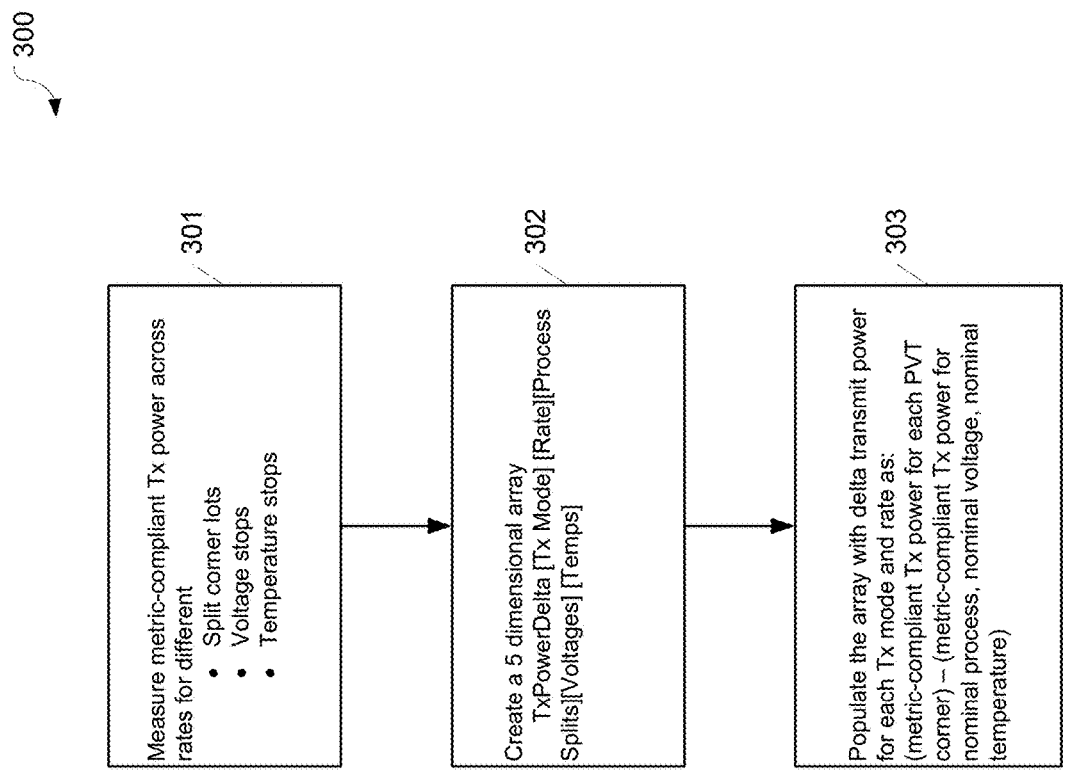
FIG. 3 shows a flow chart of a method for constructing an array of delta transmit power across process splits, operating temperatures, and operating voltages of a wireless device for different transmission modes and transmission rates in accordance with one embodiment of the present disclosure.

FIG. 3 shows a flow chart of a method 300 for constructing a multi-dimensional array of delta transmit power across process splits, operating temperatures, and operating voltages of a wireless device for different transmission modes and transmission rates in accordance with one embodiment of the present disclosure. The delta transmit power for a point in the array may represent the difference between the metric-compliant Tx power corresponding to the point and the metric-compliant Tx power for a reference operating point. An offline device characterization operation may construct the multi-dimensional array for a device, such as an RF integrated chip or a board of an RF transceiver whose metric-compliant Tx power is to be determined, by measuring and statistically characterizing multiple devices across a range of process splits, operating temperatures, and operating voltages for different transmission modes and transmission rates, etc. The offline device characterization operation may be carried out during device validation and performance characterization in a testing facility, laboratory, or in the field, etc. A wireless device may use the information from the multi-dimensional array to determine the EVM and SM compliant power during device operation.

At operation 301, the method measures the Tx power that complies with Tx-metrics across a range of process splits, voltages, and temperatures of the device. The range of process splits, voltages, and temperatures may be quantized to a limited number of discrete steps. Tx-metrics may include maximum EVM, target ACPR or SM, or other regulatory emission requirements. The method may characterize the metric-compliant Tx power for each combination of data rate and transmission mode. In one embodiment, the data rate may correspond to the MCS used for the transmission. The transmission mode may include the various modes that the device may support. For example, the transmission mode may include multiple-input multiple-output (MIMO) antenna transmission, single-input single-output (SISO) antenna transmission, space-time block codes (STBC) antenna transmission, beam-forming (BF) antenna transmission, and operating parameters such as the operating channel, operating frequency, operating bandwidth, etc. The metric-compliant Tx power for a process split, voltage, and temperature of the device transmitting with a data rate and transmission mode is the maximum transmit power that meets all the Tx metrics for that combination of process split, voltage, temperature, data rate, and transmission mode.

At operation 302, the method creates a multi-dimensional array for the device. In one embodiment, the multi-dimensional array may have 5 dimensions that include the process split, voltage, temperature, data rate, and transmission mode of the device. In other embodiments, the multi-dimensional array may have additional dimensions that may include the operating channel, operating frequency, operating bandwidth, TPC dynamic range, etc.

At operation 303, the method populates the multi-dimensional array with delta transmit power for the points in the array. The delta transmit power for a point in the array may represent the difference between the metric-compliant Tx power for the combination of process split, voltage, temperature, data rate, and transmission mode corresponding to the point and the metric-compliant Tx power for a reference operating point. In one embodiment, each combination of data rate and transmission mode may have a reference operating point specific to that combination. For example, a reference operating point for a combination of data rate and transmission mode may be designated as the nominal process split of typical/typical process, nominal voltage of 3 V, and nominal temperature of 25° C. The metric-compliant Tx power for the reference operating point for the combination of data rate and transmission mode may then be the metric-compliant Tx power when the device has the nominal process split, nominal voltage, and nominal temperature operating at the combination of data rate and transmission mode. The multi-dimensional array of the delta transmit power thus indicates the offset in metric-compliant Tx power from that of the reference operating point when the device operates with parameters different from the reference operating point.

Figure 4:
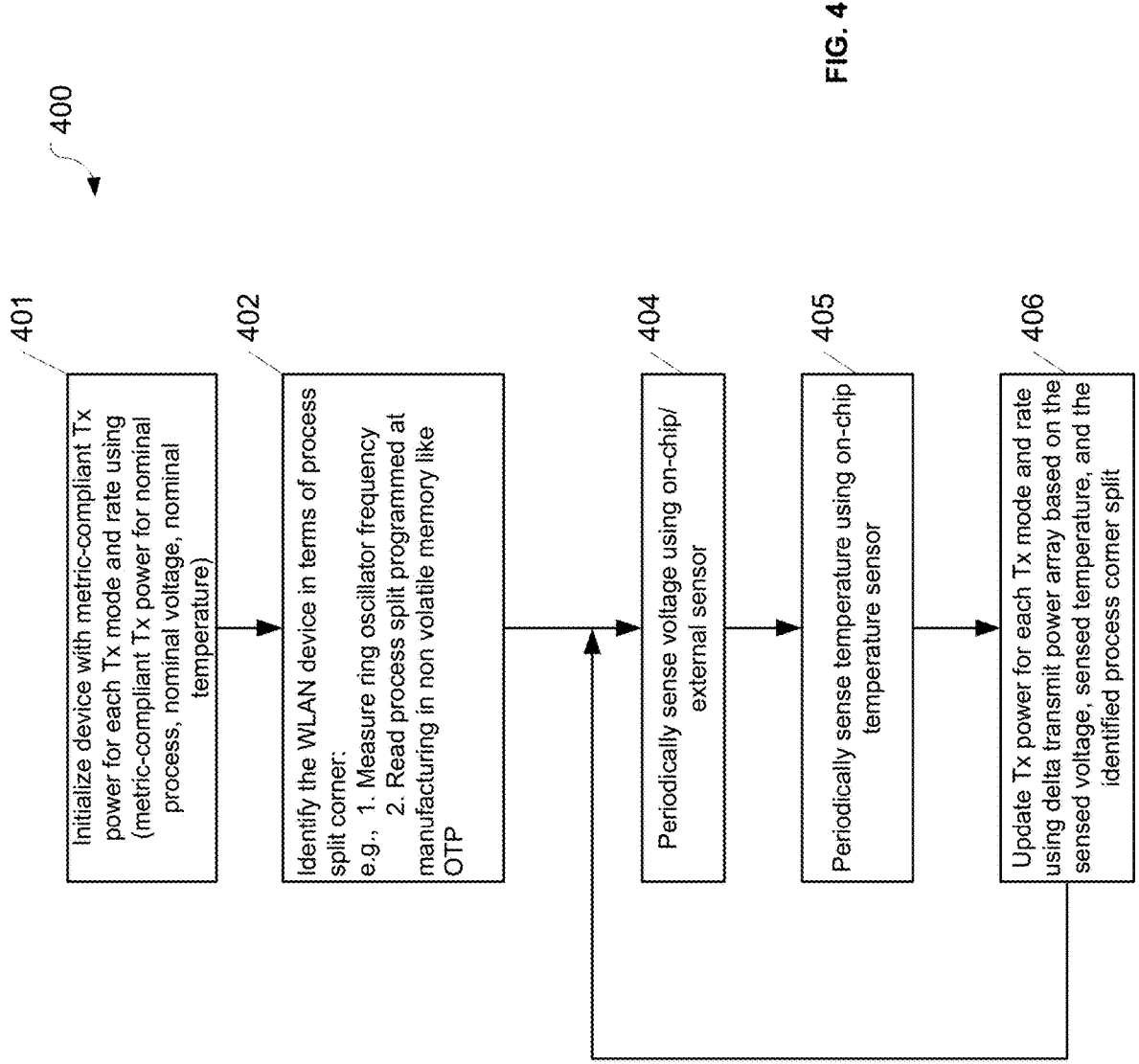
FIG. 4 illustrates a flow chart of a method for using the array of delta transmit power to tailor the transmit power of the wireless device as a function of the identified process split, sensed voltage, and sensed temperature of the device in accordance with one embodiment of the present disclosure.

FIG. 4 illustrates a flow chart of a method 400 for using the array of delta transmit power to tailor the transmit power of the wireless device as a function of the identified process split, sensed voltage, and sensed temperature of the device in accordance with one embodiment of the present disclosure. Method 400 may be performed by processing logic that may comprise hardware (e.g., circuitry, dedicated logic, programmable logic, a processing device, etc.), software (e.g., instructions running/executing on a processing device), firmware (e.g., microcode), or a combination thereof. In some embodiments, method 400 may be performed by the wireless device (e.g., STA 105 illustrated in FIG. 1), by another device remote from the wireless device, or by AP 107 of FIG. 1.

At operation 401, the method initializes the device to operate with the metric-compliant Tx power of the reference operating point. The metric-compliant Tx power of the reference operating point may be different for different combination of data rate and transmission mode. In one embodiment, the method may initialize the device to the metric-compliant Tx power of the reference operating point corresponding to a combination of a nominal data rate and a nominal transmission mode. The reference operating point may be different from the actual operating point of the device.

At operation 402, the method identifies the process split of the device. In one embodiment, the method may identify the process split of the device by using a ring oscillator to measure the ring oscillator frequency. The wireless device may use the measured ring oscillator frequency to look up a table containing the relationship between the oscillator frequency and the process split to determine the process split. In one embodiment, the process split of the wireless device may be identified at manufacturing and programmed into an on-chip non-volatile memory. The wireless device may read the non-volatile memory to determine the process split.

At operation 404, the method periodically senses the voltage of the device. The voltage may be a supply voltage to the device or the operating voltage localized to an RF circuit of the device. The method may sense the voltage using an on-chip or external sensor. In one embodiment, the period of the voltage sensing may be set to a programmable value such as 1 second. In one embodiment, the method may sense the voltage using interrupt handling.

At operation 405, the method periodically senses the temperature of the device. The temperature may be the junction or ambient temperature near a hotspot of the device. The method may sense the temperature using an on-chip temperature sensor, thermistor, etc. The period of the temperature sensing may also be programmable. In one embodiment, the method may sense the temperature using interrupt handling. The period of the temperature sensing and the period of the voltage sensing may be different so that the sensing of the temperature and the voltage may be performed independently of one another.

At operation 406, the method updates the metric-compliant transmit power of the device for an operating transmit mode and data rate based on the multi-dimensional array of the delta transmit power and the identified process split, sensed voltage, and sensed temperature. For example, the method may determine the delta transmit power from the point in the multi-dimensional array corresponding to the identified process split, sensed voltage and sensed temperature. The method may then adjust its transmit power from the reference operating point by the delta transmit power to tailor its transmit power to the identified parameters.

In one embodiment, when one or more of the parameters of process split, sensed voltage and sensed voltage cannot be determined or is unknown, the method may search the multi-dimensional array of the delta transmit power to determine the minimum of the delta transmit power over the range of the unknown parameters corresponding to the known parameters or parameters. For example, if the temperature and the process split are identified but the temperature is unknown, the method may determine the minimum of the delta transmit power across the range of temperatures in the multi-dimensional array corresponding to the known voltage and the identified process split. The method may adjust its transmit power from the reference operating point by the minimum delta transmit power found to tailor its transmit power to the known voltage and the identified process split.

In one embodiment, during successive updates to the transmit power when the voltages and the temperatures are periodically sensed, the method may determine the difference between the delta transmit power of the current iteration and the previous iteration. The method may adjust the transmit power by the difference found between the iterations. For example, if for a previously sensed voltage and temperature, the delta transmit power (e.g., the difference between the metric-compliant Tx power for the previous iteration and the metric-compliant Tx power for the reference operating point) is determined to be x, and for the current sensed voltage and temperature, the delta transmit power is determined to be y, the method may adjust the transmit power for the current iteration by (y−x).

Figure 5:
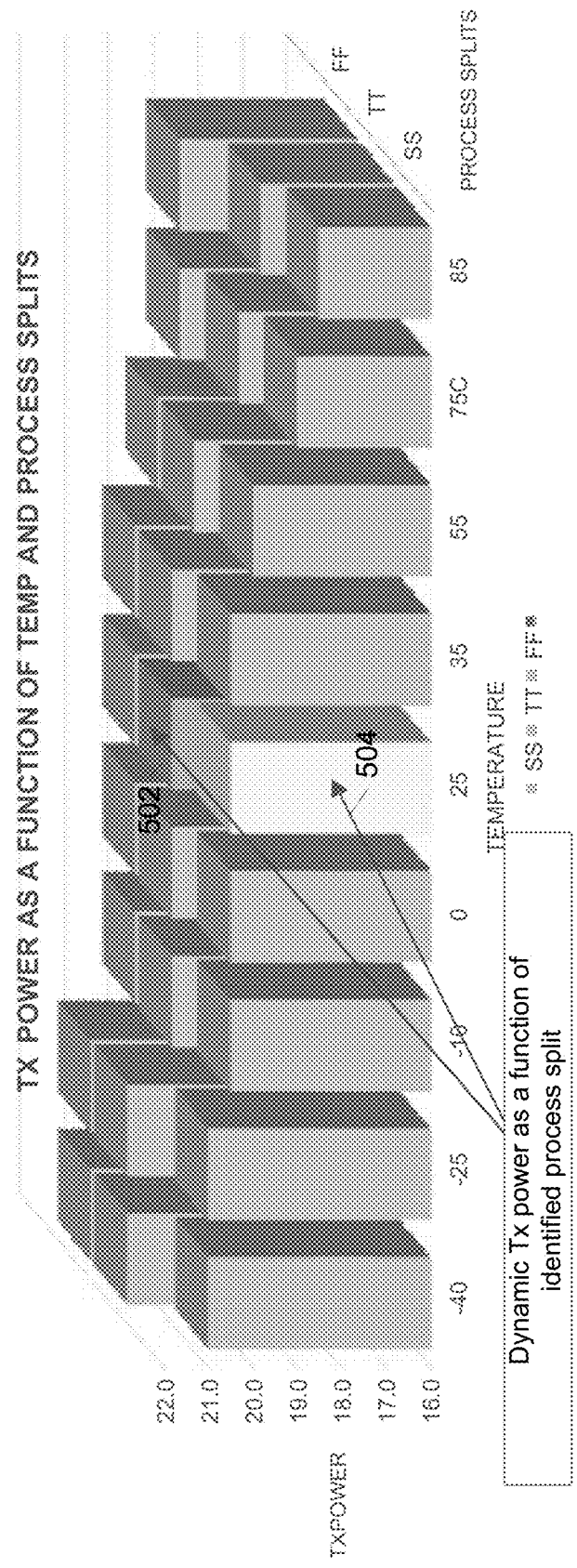
FIG. 5 is a diagram illustrating an updating of the transmit power as a function of the identified process split from a nominal process by a wireless device operating in a nominal voltage and nominal temperature in accordance with one embodiment of the present disclosure.

FIG. 5 is a diagram illustrating an updating of the transmit power as a function of the identified process split from a nominal process by a wires device operating in nominal voltage and nominal temperature in accordance with one embodiment of the present disclosure. The device may be initialized to operate with the metric-compliant Tx power 502 for the reference operating point represented by the nominal process split of typical/typical process, nominal voltage of 3V, and nominal temperature of 25° C. When the device identifies its process split as the slow/slow process and determines the device as operating with the nominal voltage and nominal temperature, the device may read the delta transmit power from the multi-dimensional array corresponding to the slow/slow process, nominal 3V voltage, and nominal 25° C. temperature. The device may adjust its transmit power by the delta transmit power to tailor its transmit power 504 to the slow/slow process.

Figure 6:
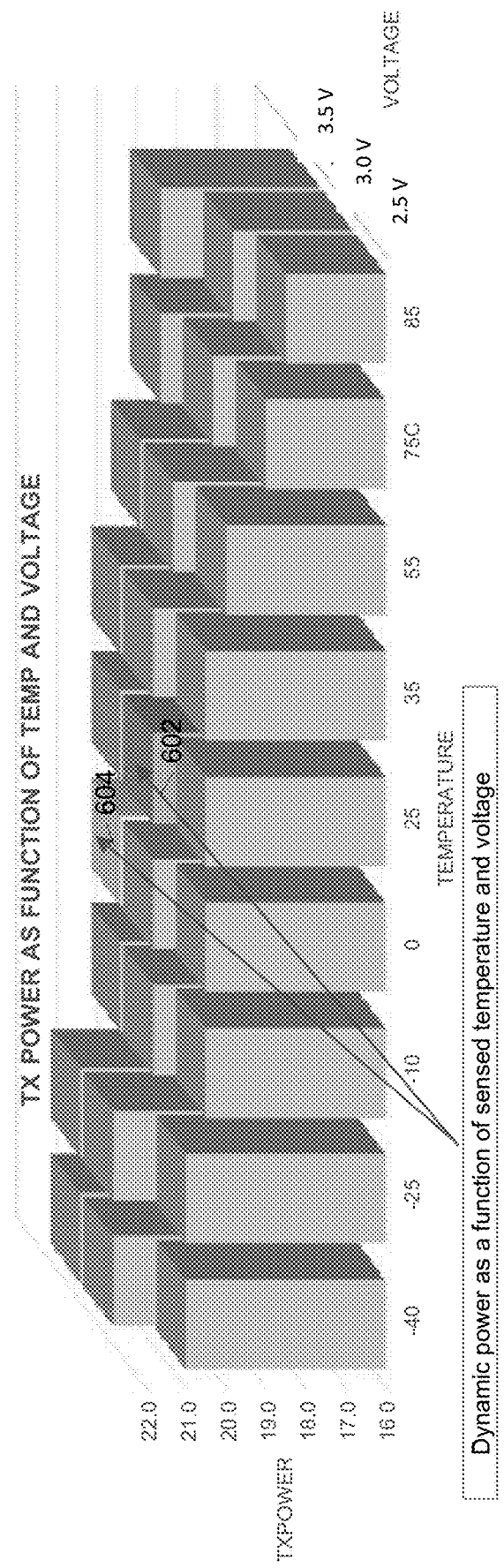
FIG. 6 is a diagram illustrating an updating of the transmit power as a function of the sensed voltage and sensed temperature from a nominal voltage and nominal temperature by a wireless device in accordance with one embodiment of the present disclosure.

FIG. 6 is a diagram illustrating an updating of the transmit power as a function of the sensed voltage and sensed temperature from a nominal voltage and nominal temperature by a wireless device in accordance with one embodiment of the present disclosure. Again, the device may be initialized to operate with the metric-compliant Tx power 602 for the reference operating point represented by the nominal process split of typical/typical process, nominal voltage of 3V, and nominal temperature of 25° C. When the device identifies its process split as the typical/typical process and determines the device as operating at 3.V and 0° C., the device may read the delta transmit power from the multi-dimensional array corresponding to the typical/typical process, 3.5 V voltage, and nominal 0° C. temperature. The device may adjust its transmit power by the delta transmit power to tailor its transmit power 604 to the sensed voltage and temperature.

Figure 7:
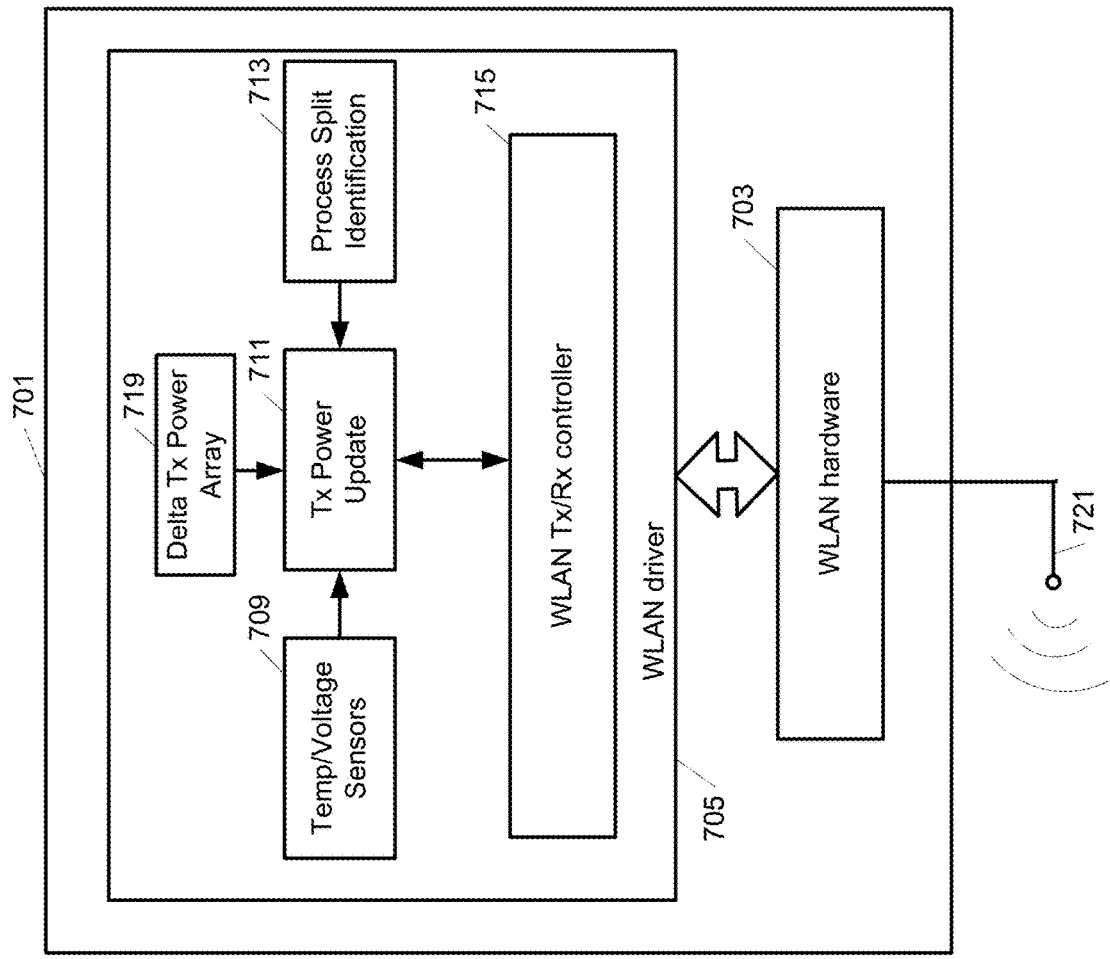
FIG. 7 is a block diagram of a wireless device that senses the operating voltage and operating temperature, and identifies the process split to tailor the transmit power in accordance with one embodiment of the present disclosure.

FIG. 7 is a block diagram of a wireless device 701 that tailors the transmit power to the split process, sensed voltage, and sensed temperature of the device in accordance with some embodiments of the present disclosure. The wireless device 701 may be the STA or the AP 107 of FIG. 1.

The wireless device 701 may include the WLAN hardware 703 and the WLAN driver 705. The WLAN driver 705 may include the WLAN Tx/Rx controller 715, delta Tx power array 719, process split identification module 713, temperature and voltage sensors 709, and Tx power update module 711. The delta Tx power array 719 may be stored in memory as a multi-dimensional array of the delta transmit power relative to a reference operating point for each combination of transmit mode and data rate. The process split identification module 713 may be a ring oscillator configured to determine the process split of the device 701. The temperature and voltage sensors 709 may be circuits configured to sense the temperature and voltage of the device 701. The Tx power update module 711 may be configured to update the metric-compliant transmit power of the device 701 for a combination of operating transmit mode, data rate, operating channel, frequency, and bandwidth, etc., based on the multi-dimensional array of the delta transmit power and the identified process split, sensed voltage, and sensed temperature. The WLAN Tx/Rx controller 715 may be configured to control the various modules in performing the operations of the method of FIG. 4. The WLAN hardware 703 may be configured to transmit the data packets from an antenna 721 using the metric-compliant transmit power.

In one embodiment, the wireless device 701 may include a memory and a processing device (not shown). The memory may be synchronous dynamic random access memory (DRAM), read-only memory (ROM)), or other types of memory, which may be configured to store the code to perform the function of the WLAN driver 705. The processing device may be provided by one or more general-purpose processing devices such as a microprocessor, central processing unit, or the like. In an illustrative example, processing device may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device may also comprise one or more special-purpose processing devices such as an application specific integrated circuit (ASIC), a field programmable gate array (FPGA), a digital signal processor (DSP), network processor, or the like. The processing device may be configured to execute the operations described herein, in accordance with one or more aspects of the present disclosure, for performing the operations and steps discussed herein.

Unless specifically stated otherwise, terms such as "receiving," "generating," "verifying," "performing," "correcting," "identifying," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions. The machine-readable medium may be referred to as a non-transitory machine-readable medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Also, the terms "first," "second," "third," "fourth," etc., as used herein are meant as labels to distinguish among different elements and may not necessarily have an ordinal meaning according to their numerical designation. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of operating a wireless device, comprising:
    initializing, by the wireless device, a transmit power of the wireless device to an initial transmit power, the transmit power being associated with one or more transmit metrics;
    identifying, by the wireless device, a value for each of one or more parameters among a plurality of parameters of the wireless device;
    determining, by the wireless device, an updated transmit power based on the identified parameter values and a range of values for each of any other parameters of the plurality of parameters, the updated power being determined to be a maximum transmit power whose associated transmit metrics meet one or more target transmit metrics when the wireless device transmits based on the identified parameter values and across a range of values for each of the other parameters, wherein each other parameter corresponds to a parameter for which a value that is respectively associated with the wireless device cannot be identified by the wireless device; and
    adjusting, by the wireless device, the transmit power based on the updated transmit power.

2. The method of claim 1, wherein the plurality of parameters comprise a process split, a voltage, and a temperature of the wireless device.

3. The method of claim 1, wherein the one or more transmit metrics comprise a spectral mask (SM).

4. The method of claim 3, wherein the one or more transmit metrics further comprise an error vector magnitude (EVM) and a transmit power control (TPC) dynamic range.

5. The method of claim 3, wherein the updated power being determined to be a maximum transmit power whose associated transmit metrics meet the one or more target transmit metrics when the wireless device transmits based on the identified parameter values and across a range of values for each of the other parameters comprises the updated power being determined to be a maximum transmit power whose associated SM and EVM do not exceed a maximum EVM and a target SM, respectively, for the identified parameter values and a range of values for each of the other parameters.

6. The method of claim 5, wherein the SM and the EVM associated with the maximum transmit power do not exceed the maximum EVM and the target SM target, respectively, by one or more tolerance values.

7. The method of claim 1, wherein determining, by the wireless device, an updated transmit power based on the identified parameter values and a range of values for each of any other parameters comprises determining the updated transmit power from a multi-dimensional array of delta transmit power corresponding to a range of values for each of the plurality of parameters of the wireless device, wherein the delta transmit power corresponding to each combination of the values of the plurality of parameters is characterized to enable the transmit metrics associated with the transmit power to meet the one or more target transmit metrics.

8. The method of claim 7, wherein the multi-dimensional array is constructed from the plurality of parameters of the wireless device, wherein the plurality of parameters comprises a data rate and a transmit mode of the wireless device.

9. The method of claim 8, wherein the plurality of parameters of the multi-dimensional array further comprises an operating frequency and an operating bandwidth of the wireless device.

10. The method of claim 7, wherein the delta transmit power corresponding to each combination of the variations of the plurality of parameters of the multi-dimensional array is characterized relative to the initial transmit power.

11. The method of claim 10, wherein the initial transmit power corresponds to nominal values of the plurality of parameters, and wherein the initial transmit power enables the associated transmit metrics to meet the one or more target transmit metrics when the plurality of parameters of the wireless device are at the nominal values.

12. The method of claim 7, wherein determining the updated transmit power from the multi-dimensional array of delta transmit power comprises determining a minimum of the delta transmit power corresponding to the identified parameter values and across the range of values for each of the other parameters as the updated transmit power.

13. The method of claim 1, wherein identifying, by the wireless device, a value for each of the one or more parameters of the plurality of parameters of the wireless device comprises identifying the one or more parameter values periodically, and wherein determining, by the wireless device, an updated transmit power based on the identified parameter values and a range of values for each of any other parameters of the plurality of parameters comprises determining the updated transmit power periodically based on the one or more identified parameter values periodically identified and the range of values for each of the other parameters.

14. The method of claim 1, wherein the wireless device comprises a wireless local area network (WLAN) device.

15. A wireless device, comprising:
    a memory; and a processing device, operatively coupled to the memory, the processing device configured to:
  initialize a transmit power of the wireless device to an initial transmit power, the transmit power being associated with one or more transmit metrics;
  identify a value for each of one or more parameters of a plurality of parameters of the wireless device;
  determine an updated transmit power based on the identified parameter values and a range of values for each of any other parameters of the plurality of parameters, the updated power being determined to be a maximum transmit power whose associated transmit metrics meet one or more target transmit metrics when the wireless device transmits based on the identified parameter values and across a range of variations for each of the other parameters, wherein each other parameter corresponds to a parameter for which a value that is respectively associated with the wireless device cannot be identified by the wireless device; and
  adjust the transmit power based on the updated transmit power.

16. The wireless device of claim 15, wherein the plurality of parameters comprise a process split, a voltage, and a temperature of the wireless device.

17. The wireless device of claim 15, wherein the processing device is configured to identify the one or more identified parameter values of the plurality of parameters of the wireless device by using one or more of the following:
  a ring oscillator circuit or a non-volatile memory configured to identify the process split;
  a voltage sensor configured to sense the voltage; or
  a temperature sensor configured to sense the temperature.

18. The wireless device of claim 15, wherein the one or more transmit metrics comprise a spectral mask (SM).

19. The wireless device of claim 18, wherein the one or more transmit metrics further comprise an error vector magnitude (EVM) and a transmit power control (TPC) dynamic range.

20. The wireless device of claim 18, wherein the processing device configured to determine a maximum transmit power whose associated transmit metrics meet the one or more target transmit metrics when the wireless device transmits based on the identified parameter values and across a range of values for each of the other parameters comprises the processing device being further configured to:
  determine the updated power to be a maximum transmit power whose associated SM and EVM do not exceed a maximum EVM and a target SM, respectively, for the identified parameter values and a range of variations for each of the other parameters.

21. The wireless device of claim 20, wherein the SM and the EVM associated with the maximum transmit power do not exceed the maximum EVM and the target SM target, respectively, by one or more tolerance values.

22. The wireless device of claim 15, wherein the processing device configured to determine an updated transmit power based on the identified parameter values and a range of values for each of any other parameters comprises the processing device being further configured to:
  determine the updated transmit power from a multi-dimensional array of delta transmit power corresponding to a range of values for each of the plurality of parameters of the wireless device, wherein the delta transmit power corresponding to each combination of the values of the plurality of parameters is characterized to enable the transmit metrics associated with the transmit power to meet the one or more target transmit metrics.

23. The wireless device of claim 22, wherein the multi-dimensional array is constructed from the plurality of parameters of the wireless device, wherein the plurality of parameters comprises a data rate and a transmit mode of the wireless device.

24. The wireless device of claim 23, wherein the plurality of parameters of the multi-dimensional array further comprises an operating frequency and an operating bandwidth of the wireless device.

25. The wireless device of claim 22, wherein the delta transmit power corresponding to each combination of the variations of the plurality of parameters of the multi-dimensional array is characterized relative to the initial transmit power.

26. The wireless device of claim 25, wherein the initial transmit power corresponds to nominal values of the plurality of parameters, and wherein the initial transmit power enables the associated transmit metrics to meet the one or more target transmit metrics when the plurality of parameters of the wireless device are at the nominal values.

27. The wireless device of claim 22, wherein the processing device configured to determine the updated transmit power from the multi-dimensional array of delta transmit power comprises the processing device being further configured to:
  determine a minimum of the delta transmit power corresponding to the identified parameter values and across the range of variations for each of the other parameters as the updated transmit power.

28. The wireless device of claim 15, wherein the processing device configured to identify a value for each of one or more parameters of a plurality of parameters of the wireless device comprises the processing device being further configured to:
  identify the value for each of the one or more parameters periodically,
  and wherein the processing device configured to determine an updated transmit power based on the identified parameter values and a range of values for each of any other parameters comprises the processing device being further configured to:
  determine the updated transmit power periodically based on the one or more identified parameter values periodically identified and the range of values for each of any of the other parameters.

29. The wireless device of claim 15, wherein the wireless device comprises a wireless local area network (WLAN) device.

30. A wireless communication device, comprising:
  one or more antennas configured to transmit or receive over a wireless channel;
  a processing device configured to:
    initialize a transmit power of the wireless communication device to an initial transmit power, the transmit power being associated with one or more transmit metrics;
    identify a value for each of one or more parameters of a plurality of parameters of the wireless communication device;
    determine an updated transmit power based on the identified parameter values and a range of values for each of any other parameters of the plurality of parameters, the updated power being determined to be a maximum transmit power whose associated transmit metrics meet one or more target transmit metrics when the wireless communication device transmits based on the identified parameter values and across a range of values for each of the other parameters, wherein each other parameter corresponds to a parameter for which a value that is respectively associated with the wireless device cannot be identified by the wireless device; and adjust the transmit power based on the updated transmit power.

* * * * *